US006734909B1

(12) United States Patent
Terane et al.

(10) Patent No.: US 6,734,909 B1
(45) Date of Patent: May 11, 2004

(54) ELECTRONIC IMAGING DEVICE

(75) Inventors: Akio Terane, Sagamihara (JP); Takashi Suzuki, Hino (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 09/426,842

(22) Filed: Oct. 26, 1999

(30) Foreign Application Priority Data

Oct. 27, 1998 (JP) ............................................ 10-305475

(51) Int. Cl.[7] ............................ H04N 5/222; G09G 5/00
(52) U.S. Cl. ........................ 348/333.05; 348/333.11; 345/721; 345/837
(58) Field of Search ...................... 348/333.01, 333.05, 348/333.11, 333.12, 333.02, 328; 345/721, 723, 837, 835

(56) References Cited

U.S. PATENT DOCUMENTS

| 6,097,431 | A | * | 8/2000 | Anderson et al. | ......... 348/231.7 |
|---|---|---|---|---|---|
| 6,201,571 | B1 | * | 3/2001 | Ota | .............................. 348/239 |
| 6,215,523 | B1 | * | 4/2001 | Anderson | ............... 348/333.05 |
| 6,233,015 | B1 | * | 5/2001 | Miller et al. | ............ 348/333.05 |
| 6,313,877 | B1 | * | 11/2001 | Anderson | ............... 348/333.05 |
| 6,389,159 | B2 | * | 5/2002 | Gilman et al. | ............... 382/162 |
| 6,445,412 | B1 | * | 9/2002 | Shiohara | ................. 348/333.05 |
| 6,515,704 | B1 | * | 2/2003 | Sato | ....................... 348/333.11 |
| 6,538,698 | B1 | * | 3/2003 | Anderson | ............... 348/333.05 |

FOREIGN PATENT DOCUMENTS

| JP | 1079912 | 3/1998 |
|---|---|---|
| JP | 10164557 | 6/1998 |

* cited by examiner

*Primary Examiner*—Aung Moe
*Assistant Examiner*—Lin Ye
(74) *Attorney, Agent, or Firm*—Ostrolenk, Faber, Gerb & Soffen, LLP

(57) ABSTRACT

An electronic imaging device has a reproduction section which reproduces at least one of a thumbnail image and a full image, display section to display reproduced at least one of the thumbnail image and the full image, a scene select section which selects a desired thumbnail image and outputs a scene select signal, and display controller to display a full image corresponding to the desire thumbnail signal in the display section based on the scene select signal output at the end, and the display controller controls the record reproduction section before reproducing the full image corresponding to the thumbnail image based on the scene select signal output at the end when the plurality of scene select signals are input.

5 Claims, 6 Drawing Sheets

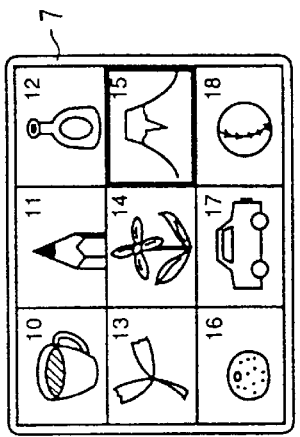
FIG. 6B
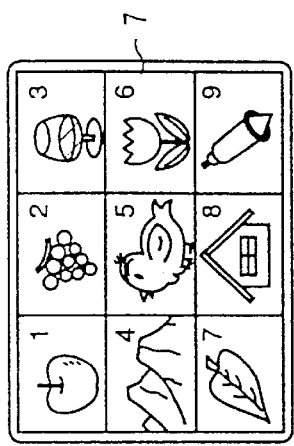
FIG. 6D
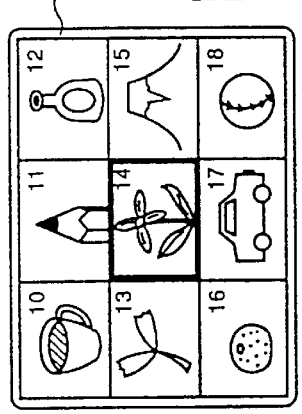
FIG. 6A
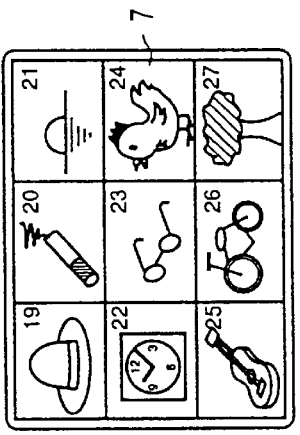
FIG. 6E
FIG. 6C

ELECTRONIC IMAGING DEVICE

BACKGROUND OF THE INVENTION

The present invention relates to an electronic imaging device, which functions to reproduce imaged image, to advance and display a scene.

Recently, an electronic imaging device known as a digital camera became widely available.

The subject image imaged with the digital camera is imaged on a CCD element and photoelectric processing is performed. There is now a CCD element having 1,400,000 or more pixels, and it has become possible to image with a high resolution.

The image signal that the photoelectric conversion processing obtains is recorded on the memory card as digital data. The image recorded on the memory card can be reproduced on an LCD display of the digital camera. As described above, it is also an important, desirable feature of the digital camera to be able to reproduce the imaged image there.

In addition, in the digital camera, the scene can sequentially be advanced from the latest image in a state of displaying the imaged image with a full screen display on the LCD display. In other digital cameras, the desired image is selected from the index image having a plurality of reduced images and the selected image can be displayed on a full screen.

However, since, for example, several seconds are required for reading the image (hereafter, it is called as "full image") which is displayed on a full screen, the user of the digital camera must wait until this full image is displayed.

The technology, which selects the desired image from the index image and displays the full image, is a technology developed to reduce such waiting time as much as possible. However, it is necessary to wait for the reproduction display of the full image after the image is selected. When desiring to advance the scene to the following image during waiting time when the full image is displayed, it is necessary to wait until the full image display is completed to obtain the next image.

Especially, in recent years, because of the increasing capacity of the memory card, that enabled taking 200 and/or 300 pictures with one memory card, shortening the scene advance access time to each image is strongly demanded.

BRIEF SUMMARY OF THE INVENTION

An object of the present invention is to provide an electronic imaging device which makes it possible to shorten scene advance access time to imaged images.

Another object of the present invention is to provide an electronic imaging device which makes it possible to further speed-up an access to a lot of images stored on the memory card.

An electronic imaging device according to the present invention is characterized by comprising: a reproduction section which reproduces at least one of a thumbnail image and a full image; display section to display reproduced at least one of the thumbnail image and the full image; a scene select section which selects a desired thumbnail image and outputs a scene select signal; and display controller to display a full image corresponding to the desire thumbnail signal in the display section based on the scene select signal output at the end, and the display controller controls the record reproduction section before reproducing the full image corresponding to the thumbnail image based on the scene select signal output at the end when the plurality of scene select signals are input.

The preferred features of an electronic imaging device of the present invention are as follows.

(1) The scene select section includes a select key which can select the thumbnail image every one scene in order of imaging or the opposite order thereof.

(2) A display switch instruction section which reads a plurality of thumbnail images to the reproduction section, and directs to display it on the display section as index image, wherein the scene select section selects the desired thumbnail image from the index image is further provided.

(3) The scene select section includes a select key which can select the thumbnail image every one scene in order of imaging or the opposite order thereof, and an index select key which selects the index image.

(4) The scene select key and the index select key have the cross shape installed as one body.

Since an electronic imaging device according to the present invention interrupts reproduction of the full image and reproduces the full image based on a new scene select signal when a new scene select signal is input while reproducing the full image, the user obtains the following image without waiting for the full image display when the plurality of scene select signals are input.

Another electronic imaging device, which can read at least one of a thumbnail image and a full image from a record medium where the thumbnail image and the full image are separately recorded for one scene, according to the present invention is characterized by comprising: a memory section which memorizes at least one of the thumbnail image and the full image read from the record medium; a scene select section which selects a desired thumbnail image; display section to display at least one of the full image corresponding to the thumbnail image and the thumbnail image memorized to the memory section; and reading controller to memorize the full image corresponding to the thumbnail image to the memory section after the thumbnail image corresponding to the scene selected by the scene select section is displayed on the display section, and the reading controller interrupts memorizing the full image data to the memory section, when the scene besides the full image is selected before completing the memory of the full image to the memory section.

The preferred features of another electronic imaging device according to the present invention are as follows.

(1) The reading controller interrupts memorizing the full image to the memory section, and displays a thumbnail image corresponding to another scene newly selected in the display section.

(2) The scene select section includes a key which can select the thumbnail image every one scene in order of imaging or an opposite order thereof.

In another electronic imaging device according to the present invention, the thumbnail image, which can be displayed in a comparatively short time, is displayed during memorizing the full image, which requires a long time, to the memory section, when the user sees the thumbnail image and the scene advance instruction is input before the memory of the full image is completed, the memory of the full image is discontinued. Then, the following thumbnail image is displayed and read of the full images is started. When read of the full image is completed while the user does not input the scene advance instruction, the full image is displayed instead of the thumbnail image. Therefore, when the scene advance is performed, the user does not wait for the display of the full image, confirm the content of the image by the thumbnail image, and perform further scene advance after confirming. Since the full image is memorized while displaying the thumbnail image, the full image is displayed at several seconds after the thumbnail is displayed.

Since it is possible to advance or retreat the scene by the index image unit, even if a lot of images are stored in the storage medium, the desired image can be accessed at high speed.

Therefore, the following advantages are achieved according to the present invention.

(1) When the scene select signal is input while reproducing the full image, since the reproduction of the full image is interrupted, the thumbnail image (or, full image) corresponding to a new scene select signal can be reproduced and displayed without waiting for the reproduction end of the full image.

(2) Since the scene selection is performed by the thumbnail image with the short reproduction time, the content of the image can be promptly confirmed without waiting for the display of full image with a long reproduction processing time.

(3) Since the full image is displayed in several seconds after the thumbnail is displayed, the image display can be seen high minute full image without waiting the image display.

(4) Since the display scene is selected by putting the desired thumbnail image into the selectable state from the index image in which the thumbnail image is arranged in the predetermined order, the comparison between images and the selection of the image can be facilitated.

(5) Since the scene is advanced or retreated by the index image unit, even if a lot of images are stored in the storage medium, the desired image can be accessed at high speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6A to FIG. 6E are figures which show display example of display section at reproduction operation.

DETAILED DESCRIPTION OF PREFERRED EMBODIMENTS OF THE INVENTION

Figure 1A:
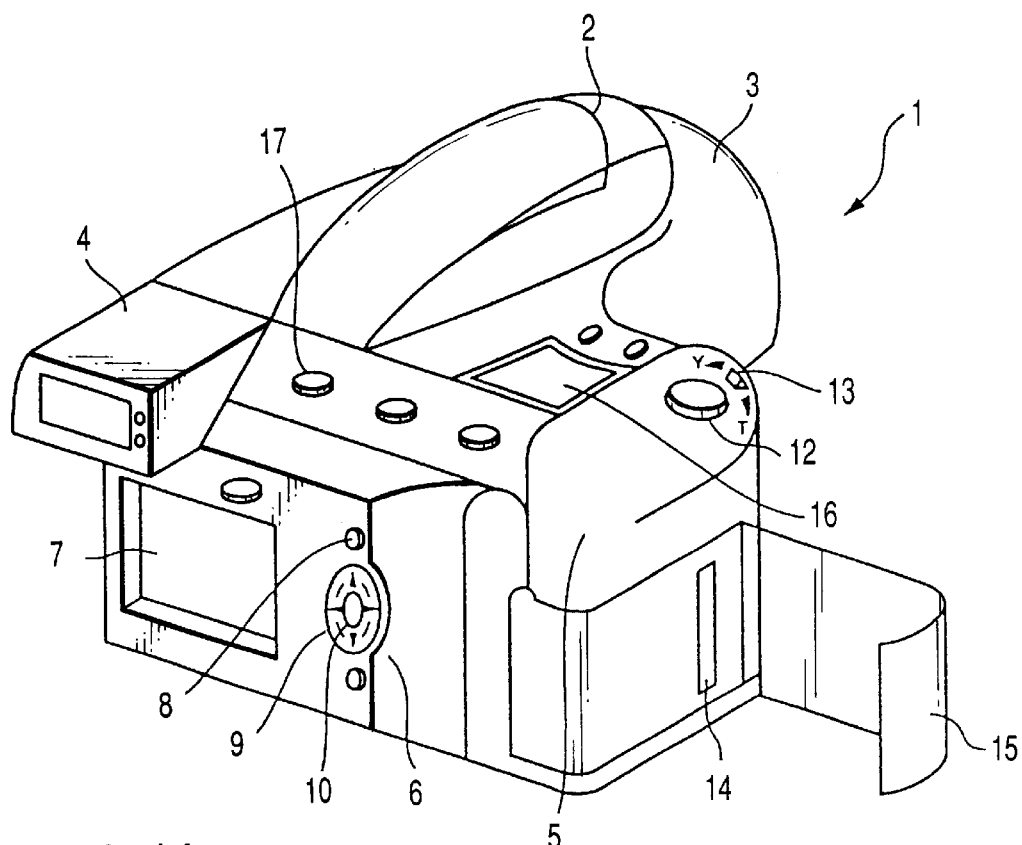
FIG. 1A and FIG. 1B are perspective views which show outlines of digital camera according to present invention.

Hereafter, an embodiment of the present invention is explained referring to the drawings.

Figure 1B:
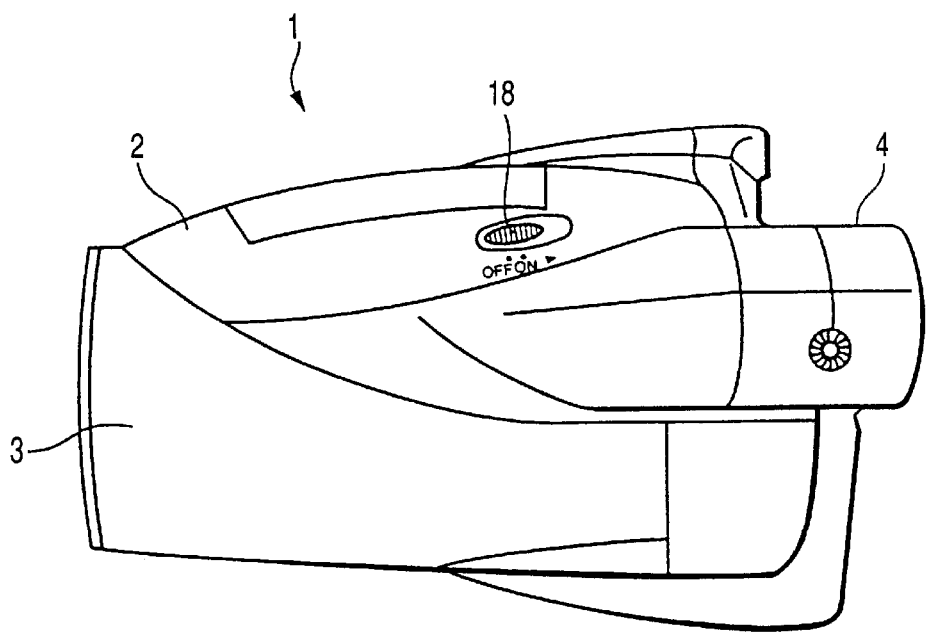

FIG. 1A and FIG. 1B are external views of digital camera 1.

FIG. 1A is a perspective view seen from a rear upper side of a right diagonal, and FIG. 1B is a front view seen from left side.

In FIG. 1A and FIG. 1B, projection section 3 incorporating an imaging optical system such as imaging lens at the left of the front side is provided in main body 2 (main body of the camera) of digital camera 1, viewfinder 4 is provided at the left of the rear side, and grip section 5 for the user to hold main body 2 of the camera is provided at the right side.

Recess 6 is provided at the right of the rear side of main body 2 of the camera in grip section 5, and this recess 6 has a shape which suits the base section of right hand thumb in consideration of easiness when the user holds with the right hand. The user can improve stability by further supporting the left side of main body 2 of the camera by the left hand from the lower side.

Display section 7, which consists of the liquid crystal monitor such as TFT-LCD, for example, is provided behind main body 2 of the camera located under viewfinder 4. The user can check the subject image visually through not only the viewfinder 4 but also this display section 7.

Menu key 8, cross key 9, and final key 10 to display the menu in a rear central section of main body 2 of the camera are provided. These keys 8 to 10 are provided at the position which can be operated by the right hand thumb with the user held grip section 5 with the right hand.

Here, the function to select the display item displaying the menu is allocated to cross key 9 and the function to fix to execute the display item displaying the menu is allocated to final key 10.

Moreover, in a front right upper portion of main body 2 of the camera, both of shutter button 12 and zoom button 13 are set at the position which can be operated by the right hand forefinger when the user holds grip section 5 with the right hand. In addition, memory card insertion section 14 is provided under the right side portion of main body 2 of the camera in FIG. 1A, external departure of the memory card and invading the dust can be prevented by shutting cover section 15.

On the other hand, control panel 16 and various switches 17, which can display control information on the amount of the battery remainder etc., are set up in an upper portion of main body 2 of the camera. Power switch 18 is provided on a left side of main body 2 of the camera as shown in FIG. 1B.

Figure 2A:
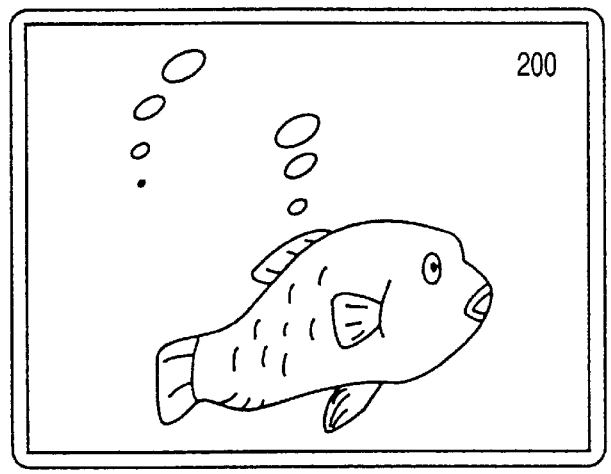
FIG. 2A to FIG. 2C are figures which show full image, thumbnail image and index image, respectively.
Figure 2B:
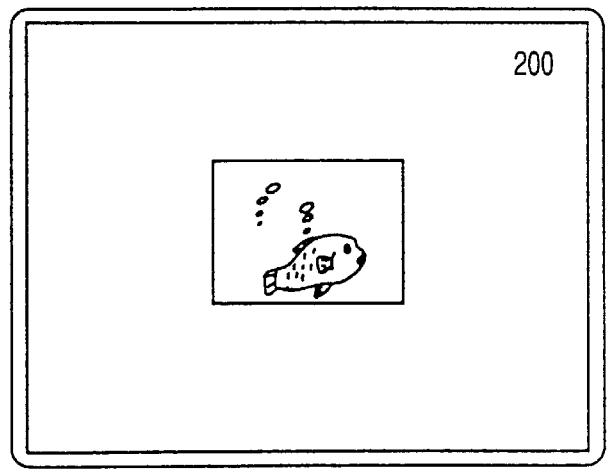
Figure 2C:
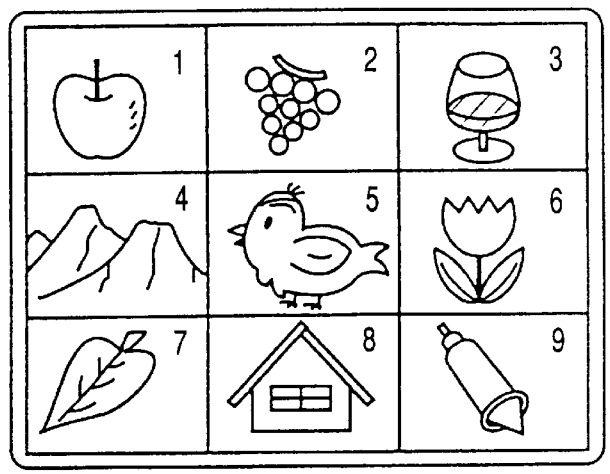

When the imaged image is reproduced by using digital camera 1 which is constructed as described above, the image can be displayed in each of the modes shown in FIG. 2A to FIG. 2C. FIG. 2A shows full image display, FIG. 2B shows a thumbnail image display, and FIG. 2C shows an index image display. In the following embodiments, the full image is defined as image data based on the full quality of the image taken and initially recorded. Here, as a quality of the record image, there are qualities of, for example, SQ (Standard: 640×512 pixels for example), HQ (High quality: 800×640 pixels for example) and SHQ (High minuteness: 1280×1024 pixels for example), and the picture quality improves while becoming the quality of SHQ from SQ. The thumbnail image represents a reduced resolution image. The image in which the plurality of thumbnail image is displayed in display section 7 at the same time is called an index image.

The full image (FIG. 2A) reduces an original image of about 1,000,000 pixels to about 100,000 pixels for example and is reproduced. On the other hand, the thumbnail image (FIG. 2B) is an image displayed on the display screen, for example, by 1/9 sizes, and has 19,200 pixels in the EXIF standard. The index image (FIG. 2C) is an image which displays the thumbnail image which is arranged in order of imaging or in the opposite order thereof, on the entire screen of the display section.

Because the number of pixels of the full image is more than that of the thumbnail image, the full image has a high resolution, and suitable for better appreciation thereof etc. On the other hand, the thumbnail images can be displayed as an index image by arranging a plurality of thumbnail image on the screen, and is suitable for the comparison between images and the selection of the desired image. The time needed for displaying the image information, starting with reading it to the memory to its display is several seconds for the full image reproduction and on the order of 1/100 seconds for the thumbnail image.

When the index image (nine thumbnail images) shown in FIG. 2C is displayed, the function to switch to the index image which consists of nine thumbnail images before and after not being displayed on the display screen of the index image of current is allocated to the up and down keys of the cross key 9, and the function (scene advance function) to enable the selection of an arbitrary scene image in the current index image is allocated to the right and left key thereof.

The scene advance function is allocated to a right and left key of cross key 9 when the full image is displayed.

(Circuit Block Diagram of Digital Camera)

Figure 3:
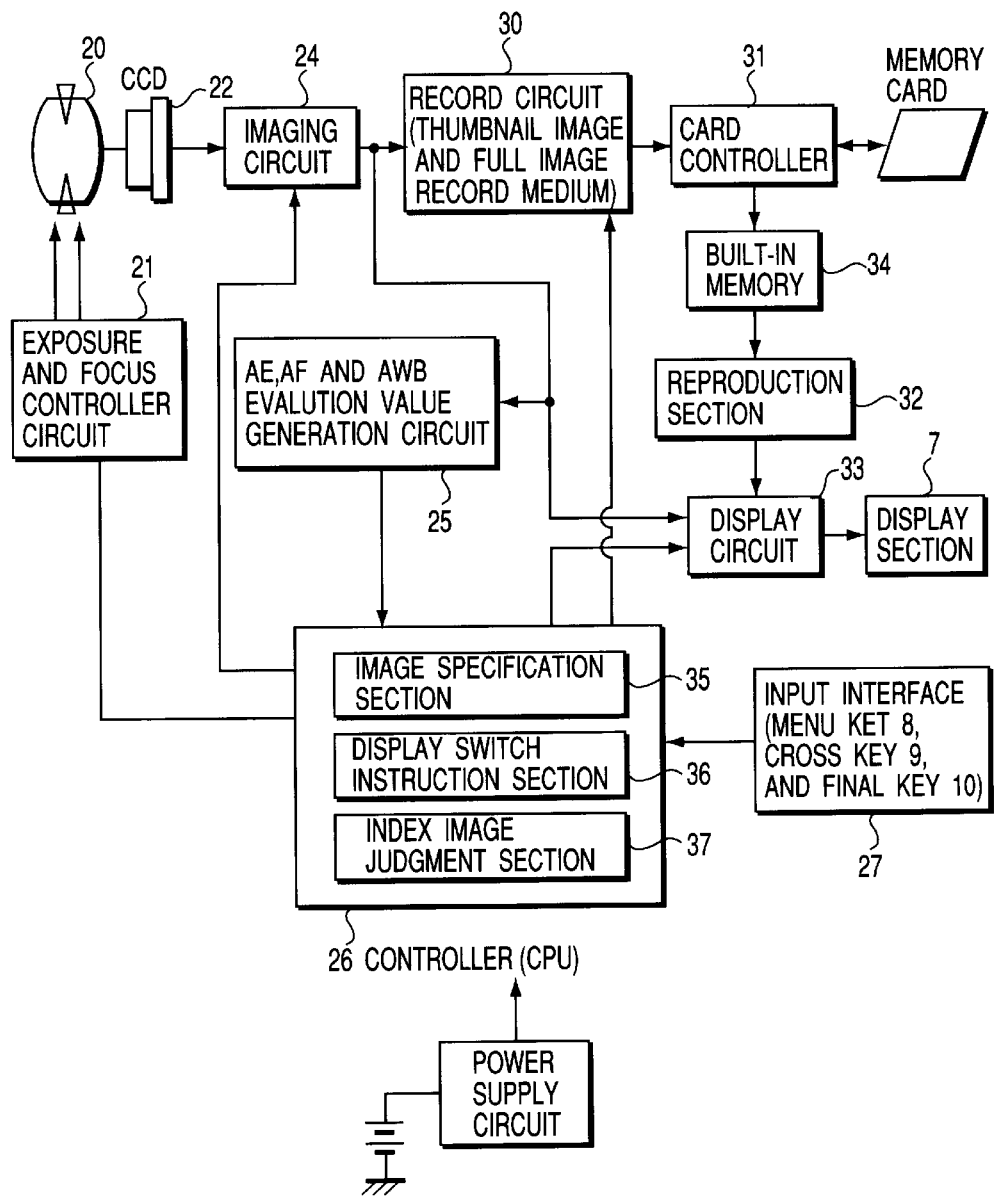
FIG. 3 is a block diagram which shows circuit configuration of digital camera of FIG. 1A and FIG. 1B.

FIG. 3 is a block diagram which shows the circuit configuration of digital camera 1. The control system according to the embodiment of the present invention will be explained by dividing it into two (the imaging function and the reproduction function) referring to FIG. 3.

(Control System as Imaging Function)

First, the control system of the imaging function will be explained.

In FIG. 3, imaging lens system 20 installed in projection section 3 of main body 2 of the camera has the iris mechanism and the focus adjustment mechanism not shown in the figure. These iris mechanism and focus adjustment mechanism are controlled with iris and focus control circuit 21. The subject image obtained through the imaging lens system 20 is imaged on CCD 22 (imaging element).

This CCD 22 performs photoelectric conversion of Optical intensity of the subject image and supplies it to imaging circuit 24 as image data. This imaging circuit 24 converts image data from CCD 22 into the image signal of the predetermined color domain by performing various images of the gamma correction processing, the color separation processing, and the white balance processing, etc., and sends it to AWB (automatic white balance)/AE (automatic exposure)/AF (automatic focus) evaluation value generation circuit 25 and display circuit 33.

This AE/AF/AWB evaluation value generation circuit 25 obtains brightness, the focus distance of the subject image, and the value of the white balance etc. based on output data from CCD 22. AE is abbreviation of Automatic Exposure, and section the exposure mechanism which measures the brightness of subject and controls the exposure automatically. AF is abbreviation of Automatic Focus, and section the mechanism which automatically controls the focus adjustment by an electric section. AWB is abbreviation of Automatic White Balance, and section the mechanism which automatically changes sensitivity and adjusts the white balance is meant.

The evaluation value with this evaluation value generation circuit 25 is input to controller (CPU) 26. When the imaging mode is set to an auto, this controller 26 originates the instruction to iris/focusing controller circuit 21 based on the evaluation value, moves the imaging lens in the direction of focus, and obtains a proper focus. This controller 26 performs the arithmetic of iris, the shutter speed and the ISO sensitivity to obtain a proper exposure based on the evaluation value, and controls imaging circuit 24.

The image data processed as described above is output from the imaging circuit 24 to display circuit 33, and reproduced directly on display section 7 as a moving image. Record circuit 30 operates based on the shutter button 12 being pushed, and the image from the imaging circuit 24 is compressed and recorded on the removable memory card which is installed in card controller 31 by dividing into the static picture data of the full image and thumbnail images.

(Control System of Image Reproduction and Scene Advance Function)

Figure 4:
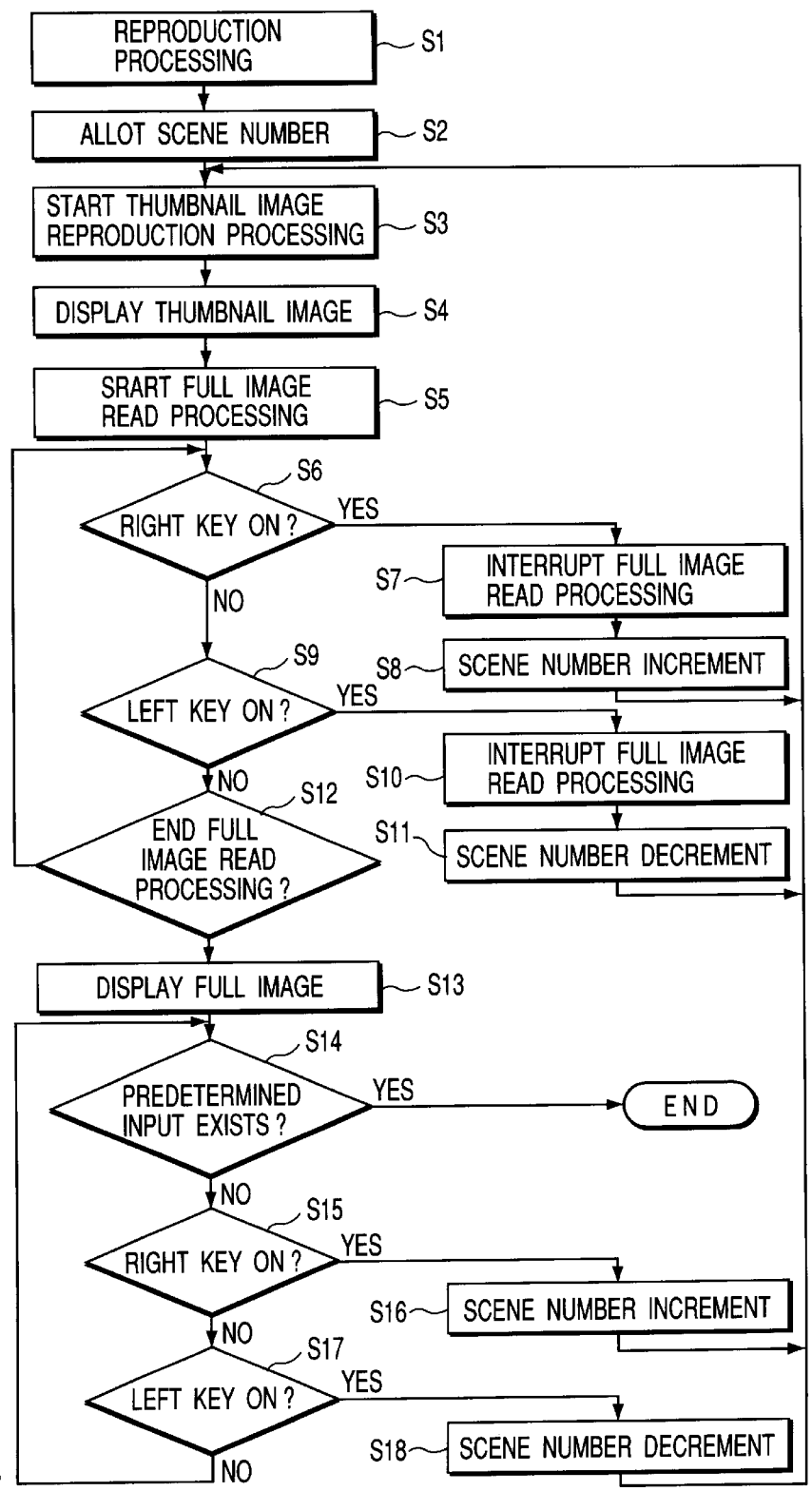
FIG. 4 is a flowchart to explain the operation of the embodiment.

Next, the reproduction function of this digital camera will be explained referring to the reproduction processing procedure shown in the flowcharts of FIG. 3 and FIG. 4. It is assumed that the number of sheets of the images stored to the memory card in this embodiment is 200 pieces. In FIG. 3, it is shown as input interface 27 by bringing various input section such as menu key 8, cross keys 9, and final keys 10 shown in FIG. 1A and FIG. 1B together.

When the instruction of the image reproduction is input through input interface 27, controller 26 operates reproduction section 32 shown in FIG. 3 and starts the reproduction processing (step S1). In this case, the image data recorded on the memory card is recorded in built-in memory 34 temporarily by card controller 31. And, data is read from this built-in memory 34 to reproduction section 32 one by one.

In this reproduction processing, controller 26 first acquires the number of sheets of the image in the memory card, and allots the scene number from the oldest image sequentially (step S2). The oldest image is allotted to the scene number of "1" and the newest image is allotted to the scene number of "200" in this embodiment.

Next, display circuit 33 displays the thumbnail image, after starting the reproduction processing of the thumbnail image of newest scene number "200" (step S4). Then, reading of the full image corresponding to the same scene number as the thumbnail image currently displayed is started (step S5).

The display processing of the thumbnail image is performed by reading the thumbnail image data memorized to the memory card to built-in memory 34, and when the read data is compression data, displaying on display section 7 after the extension processing is performed (hereafter, the processing in which the image is read from the memory card and displayed on the display section is called as "read processing"). This display is completed in about 1/100 seconds as mentioned above, and the thumbnail image of the size of 1/9 of full images is displayed in display section 7 with scene number "200" as shown in FIG. 2B. In this case, the thumbnail image can not be limited to the size of 1/9 of full images and may be displayed by an arbitrary size.

On the other hand, to read full image data, and to perform the extension processing and display thereof, several seconds are required. This includes to perform read processing which stores it in VRAM (video RAM) not shown in the figure: Step S6 to step S12 are repeated until the read processing of full image data is completed (step S12).

That is, controller 26 detects whether the right or left key of cross key 9 has been activated until the read processing of the full image is completed. When the right key is operated (step S6), controller 26 originates the instruction to interrupt the read processing of the full image to reproduction section 32 (step S7). Next, the scene number is incremented, (that is, the scene number in which one is added to current scene number is defined as the select scene number), and returns to step S3 (step S8).

That is, is the instructions of the scene advance is given while read processing of the full image, display circuit 33 immediately discontinues the current read processing of the full image. Then, the thumbnail image corresponding to the incremented scene number is displayed (step S4), and read processing of the full image corresponding to the same number is started (step S5).

When the left key is pushed (step S9), the scene number is decremented and returns to step S3 by the same procedure as the case of the right key (step S10 and step S11).

On the other hand, if the read processing of the full image is completed without operating the right or left key (step S12), the controller 26 displays the full image in the display section 7 instead of the thumbnail image (step S13).

Next, controller 26 detects the predetermined input from, for example, shutter button 12 or zoom button 13 through input interface 27 (step S14). And, if the predetermined input is detected, the imaging operation or the zoom operation of the displayed full image is performed by the predetermined operation, but the detailed explanation will be omitted since it is not related to the scope of the present invention.

When the predetermined input is not detected in step S14, controller 26 detects whether the right and left key of cross key 9 is operated after the full image is displayed (step S15 and step S17). And, when either key is operated, controller 26 increments (step S16), or decrements (step S18) the scene number, it returns to step S3 and display of the following thumbnail image and the read processing of the full image are started.

In this embodiment, in the scene advance operation, the thumbnail image is displayed in the read processing operation of the full image which requires a long time, and the full image is displayed instead of the thumbnail image when the read processing of the full image is completed.

And, if advancing the scene etc. are operated when the read operation of the full image is performed, the read processing of the full image is discontinued at that time, the display of the thumbnail image corresponding to the scene select signal output at the end is performed, and read processing of the full image corresponding to the thumbnail image is started.

According to such a configuration, there is an advantage in which the scene advance can be performed at high speed and the user can confirm the content of the image by the thumbnail image.

In any case of the thumbnail image display and the full image display, if it is the final image to which the corresponding image is imaged at the end, it is desirable to issue a warning, such as by blinking the scene number or changing the color and shape.

(Advancing Function of Index Screen)

Next, the reproduction operation involving other screens by switching the index screen will be explained, referring to FIG. 5A to FIG. 6E.

Figure 5A:
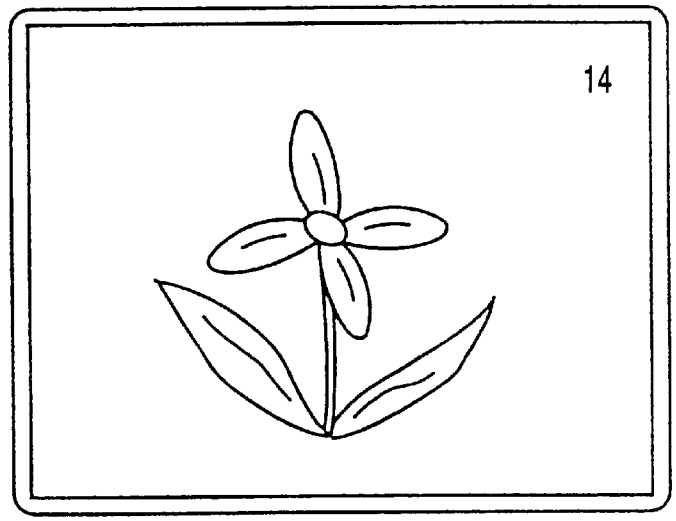
FIG. 5A and FIG. 5B are figures which show display example of display section at reproduction operation.
Figure 5B:
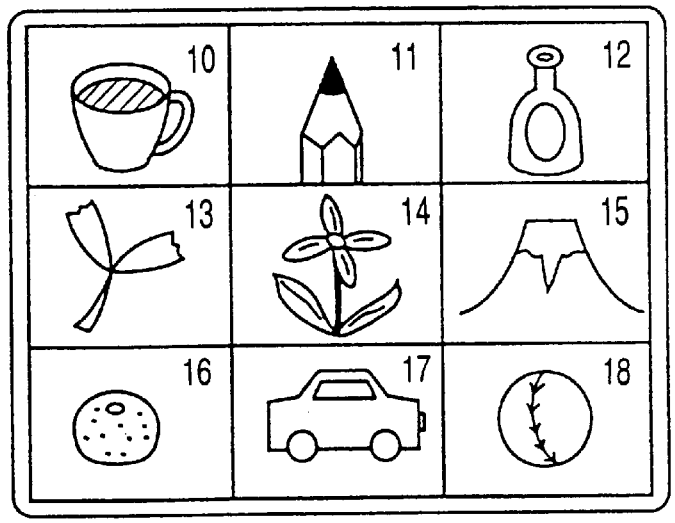

First, the function to display the index is assigned to the down key of cross key 9, and explained in the state when the full image of scene number "14" is displayed in display section 7 as shown in FIG. 5A. Therefore, when the down key of cross key 9 is operated, display switch instruction section 36 detects the operation, controls display circuit 33, and switches the display of display section 7 to the index screen in which the thumbnail image of scene number "14" is centered as shown in FIG. 5B.

FIG. 6B to FIG. 6E show the display after operation when this index screen (FIG. 5B and FIG. 6A) is made a basic screen, and each key of up, down, right and left keys of cross key 9 is operated.

When the right key is operated in the state that the index screen displayed in display section 7 (FIG. 5B and FIG. 6A), image specification section 35 moves the cursor to scene number "15" as shown in FIG. 6A from scene number "14" are shown in FIG. 6B, and the thumbnail image of scene number 15 is put to be a selectable state. Under such a condition, the operation after step S3 of FIG. 4 is executed by operating final key 10.

When the left key of cross key 9 is operated, the cursor is moved to scene number "13" as shown in FIG. 6C from scene number "14" as shown in FIG. 6A by the similar operation, the thumbnail image of scene number 13 is put to be a selectable state. And, the operation after step S3 is executed by operating a final key under such a condition.

Next, when the up key of cross key 9 is operated in the state of FIG. 6A, image specification section 35 controls display circuit 33, as shown in FIG. 6D. Here, the index images displayed are other than the thumbnail image displayed in a previous operation. The index image shows the set of thumbnail images which precede the prior set displayed. For example, when the index image which includes nine thumbnail images from the scene numbers 10 to 18 as shown in FIG. 6A is displayed, index image which does not include these thumbnail images and includes thumbnail image which is imaged before those thumbnail images are imaged. This index image includes the thumbnail images from the scene numbers 1 to 9, as shown in FIG. 6D.

Immediately after switching to this new index image, a latest thumbnail image imaged in the displayed thumbnail images, that is, thumbnail image of scene number 9 in FIG. 6D becomes the selectable state. Thus, the user can access each thumbnail image included in this index image with the right and left key of cross key 9.

When the down key of cross key 9 in the state of FIG. 6A, image specification sections 35 displays the index images except the thumbnail image displayed before the operation as shown in FIG. 6E, and displays the index image of the plurality of thumbnail images imaged after those thumbnail images by controlling display circuit 33. In this example, the index image which includes nine thumbnail images from the scene numbers 19 to 27 is displayed. When the down key is operated, immediately after switching to this new index image, the earliest thumbnail image in the displayed thumbnail images, that is, in FIG. 6E, thumbnail image of scene number 19 becomes in the selectable state.

According to such a configuration, since the scene advance by the index image unit is achieved, when a lot of images are recorded on the memory card, there is an advantage in which attainment to the desired image can be performed at the very high speed.

This invention can be variously transformed without being limited to the above-mentioned embodiment within the range where the scope of the invention is not changed.

For example, in this embodiment, though an example of the index screen where the thumbnail image of 3×3 of nine scenes are arranged is explained, the user can specify, for example, the predetermined number of scenes such as 2×2=4 scenes and 4×4=16 scenes by the predetermined operation of input interface 27. In this case, index image judgment section 37 shown in FIG. 3 judges the number of scenes, controls display circuit 33, and displays it on display section 7 as an index image display which includes thumbnail images of the predetermined number of scenes. Here, the explanation will be omitted about the selection of the full image because it is similar to the first embodiment.

In the above-mentioned embodiment, though the embodiment, in which the full image and the thumbnail image are displayed on the same screen, is not especially described, the present invention can be applied even when the full image and the thumbnail image are displayed on the same screen. In this case, the image displayed on the same screen may be one full image and one thumbnail image or one full image and the plurality of thumbnail images, and it is possible to transform it properly according to the state.

Although the cross key, which is the scene select section, is explained as a part of the digital camera, it may have the remote control function and may be dechatable.

In addition, in the above-mentioned embodiment, though the scene number is blinked to warn that it is the final image, when the displayed image is the final image, the configuration in which scene number "1" can be accessed by advanced scene of scene number "200", and scene number "200" can be accessed by retreated scene of scene number "1" with this warning.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electronic imaging device capable of selectively reading one of a thumbnail image and a full image from a recording medium, and reproducing said one of the thumbnail image and the full image, comprising:

an index image generation section which generates an index image by using a thumbnail image stored as data in the recording medium;

a display unit which displays at least the generated index image;

a scene selection section which selects a desired one of thumbnail images in the index image displayed by the display unit, and sets an active state wherein said selected desired one of the thumbnail images is expandable to a full image; and an index image switching section which switches the index image displayed by the display unit to one of a first index image corresponding to an image picked up before each of thumbnail images in the displayed index image and a second index image corresponding to an image picked up after said each thumbnail image in the displayed index image;

wherein when the index image switching section designates the first index image, the first index image is generated by the index image generation section, and displayed by the display unit, and a thumbnail image having the oldest scene number in the first index image is set in the active state, and when the index image switching section designates the second index image, the second index image is generated by the index image generation section and displayed by the display unit, and a thumbnail image having the newest number in the second index image is set in the active state.

2. The electronic imaging device according to claim 1, wherein the scene selection section and the index image switching section includes a scene selection key and an index image switching key, respectively, the scene selection key being designated to select a desired one of the thumbnail images by indicating said desired one of the thumbnail images, the index image switching key being provided along with the scene selection key as a single body.

3. The electronic imaging device according to claim 2, wherein the scene selection key and the index image switching key include respective pairs of keys which are formed as a cross key, and the thumbnail images are selectable one by one in an imaging order or the opposite order by operating the scene selection key, and the displayed index image is switched to said one of the first and second index images by operating the index image selection key.

4. The electronic imaging device according to claim 1, which further comprises a display type designation unit which designates a display type (the total number of scenes) of the index image, and wherein the index image switching section generates one of an index image which precedes the displayed index image by one index image and an index image which is subsequent to the displayed index image by one index image, on the basis of the display type (the total number of scenes) designated by the display type designation unit.

5. The electronic imaging device according to claim 1, wherein the index image switching section designates one of a first index image which is of the same type as the index image displayed by the display unit, and which is picked up by one index image before the index image displayed by the display unit, and a second index image which is of the same type as the index image displayed by the display unit, and which is picked up by one index image after the index image displayed by the display unit.

* * * * *